United States Patent
Roos

(10) Patent No.: US 7,602,092 B2
(45) Date of Patent: Oct. 13, 2009

(54) ELECTRICAL MACHINE HAVING SYMMETRICAL COIL SECTIONS

(75) Inventor: Gerald Roos, Sasbachried (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/574,154

(22) PCT Filed: Feb. 21, 2006

(86) PCT No.: PCT/EP2006/060142

§ 371 (c)(1),
(2), (4) Date: Feb. 23, 2007

(87) PCT Pub. No.: WO2006/103144

PCT Pub. Date: Oct. 5, 2006

(65) Prior Publication Data

US 2007/0228865 A1    Oct. 4, 2007

(30) Foreign Application Priority Data

Mar. 31, 2005  (DE) .................... 10 2005 015 139
Jul. 28, 2005   (DE) .................... 10 2005 035 411

(51) Int. Cl.
*H02K 23/34* (2006.01)

(52) U.S. Cl. ........................ 310/198; 310/234

(58) Field of Classification Search ................. 310/198, 310/179, 180, 184, 195, 234; H02K 23/34, H02K 23/26
See application file for complete search history.

(56) References Cited

U.S. PATENT DOCUMENTS

| | | | | | |
|---|---|---|---|---|---|
| 3,733,506 | A | * | 5/1973 | Jaffe et al. | 310/198 |
| RE27,893 | E | * | 1/1974 | Miller | 310/234 |
| 4,329,610 | A | * | 5/1982 | Klein | 310/220 |
| 6,930,429 | B2 | * | 8/2005 | Wang | 310/225 |

FOREIGN PATENT DOCUMENTS

| | | | |
|---|---|---|---|
| JP | 2002058227 | | 2/2002 |
| JP | 2002305861 | | 10/2002 |
| JP | 2002305861 | A * | 10/2002 |
| WO | 2005/076442 | | 8/2005 |

* cited by examiner

*Primary Examiner*—Quyen Leung
*Assistant Examiner*—Naishadh N Desai
(74) *Attorney, Agent, or Firm*—Michael J. Striker

(57) ABSTRACT

The invention relates to an electrical machine (10), and to a method for producing such an electrical machine, especially for adjusting mobile parts in a motor vehicle. Said machine comprises a rotor (20) on which a bipolar electrical winding (25) having a plurality of coils (26) is arranged. Said coils (26) are configured to give two symmetrical coil sections (27) each which are disposed symmetrical to each other relative to the axis of rotation (23) of the rotor (20), both coil sections (27) being simultaneously commutable.

13 Claims, 11 Drawing Sheets

| Lamination | Groove | Winding | Groove | Groove | Winding | Groove | Groove | Winding | Groove | Groove | Winding | Groove | Lamination |
|---|---|---|---|---|---|---|---|---|---|---|---|---|---|
| 1 | 1 | 8 | 5 | 10 | 9 | 6 | | | | | | | 2 |
| 2 | 2 | 8 | 6 | 1 | 9 | 7 | | | | | | | 3 |
| 3 | 3 | 8 | 7 | 2 | 9 | 8 | | | | | | | 4 |
| 4 | 4 | 8 | 8 | 3 | 9 | 9 | | | | | | | 5 |
| 5 | 5 | 8 | 9 | 4 | 9 | 10 | | | | | | | 6 |
| 6 | 6 | 8 | 10 | 5 | 9 | 1 | | | | | | | 7 |
| 7 | 7 | 8 | 1 | 6 | 9 | 2 | | | | | | | 8 |
| 8 | 8 | 8 | 2 | 7 | 9 | 3 | | | | | | | 9 |
| 9 | 9 | 8 | 3 | 8 | 9 | 4 | | | | | | | 10 |
| 10 | 10 | 8 | 4 | 9 | 9 | 5 | | | | | | | 1 |

| Lamination | Groove | Winding | Groove | Lamination |
|---|---|---|---|---|
| 1 | 1 | 25 | 4 | 2 |
| 2 | 2 | 25 | 5 | 3 |
| 3 | 3 | 25 | 6 | 4 |
| 4 | 4 | 25 | 7 | 5 |
| 5 | 5 | 25 | 8 | 6 |
| 6 | 6 | 25 | 1 | 7 |
| 7 | 7 | 25 | 2 | 8 |
| 8 | 8 | 25 | 3 | 1 |
| 1 | 8 | 25 | 5 | 2 |
| 2 | 1 | 25 | 6 | 3 |
| 3 | 2 | 25 | 7 | 4 |
| 4 | 3 | 25 | 8 | 5 |
| 5 | 4 | 25 | 1 | 6 |
| 6 | 5 | 25 | 2 | 7 |
| 7 | 6 | 25 | 3 | 8 |
| 8 | 7 | 25 | 4 | 1 | commutator rotation 209°

ELECTRICAL MACHINE HAVING SYMMETRICAL COIL SECTIONS

CROSS REFERENCE

The invention described and claimed hereinbelow is also described in German Patent Applications DE 10 2005 015 139.6 filed on Mar. 31, 2005 and DE 10 2005 035 411.4 filed on Jul. 28, 2005. This German Patent Application provides the basis for a claim of priority of invention under 35 U.S.C. 119(a)-(d).

BACKGROUND OF THE INVENTION

The present invention relates to an electric machine with a tool-poled electric winding.

U.S. Reissue 27,893 disclosed an armature winding in an electric machine in which two coils are situated approximately in geometrically parallel fashion on a laminated armature core. Such an arrangement of the two coils is produced with a winding machine on which two coils can be wound at the same time by means of two flyers. These virtually parallel coils, however, are supplied with current independently of each other so that when the coils are supplied with current during operation, radial force components are exerted on the armature, which generate undesirable motor noise.

SUMMARY OF THE INVENTION

The two-poled electric machine according to the invention and its manufacturing method, with the defining characteristics of the independent claims, have the advantage that the simultaneous commutation of the two symmetrically situated coil sections compensates for the radial force components of the two coil sections when they are supplied with current. Such a symmetrical arrangement of the two coil sections in relation to the rotation axis makes it possible with a simultaneous flow of current through the coil sections, to achieve a smoother motor operation, which significantly reduces the motor noise.

Advantageous modifications and improvements of the defining characteristics disclosed in claim 1 ensue from the defining characteristics disclosed in the dependent claims. The interfering radial force components can be compensated for with particular ease because the two coil sections are situated approximately parallel to each other geometrically, are spaced the same distance apart from the rotation axis, and have the same number of windings.

If the two coils sections are wound in the opposite winding direction from each other on the armature core, then when the coil sections are supplied with current, the respective radial force components of the coil sections are situated in precise opposition to each other. This provides optimum compensation for these radial forces.

In a preferred embodiment, the two coil sections are electrically connected in series so that they can be wound one after another in continuous fashion with a single wire.

In this case, the coil sections connected to each other in series have a total of two ends that can each be directly connected to a respective lamination of the commutator—in particular laminations situated adjacent to each other.

In an alternative embodiment, the two coil sections are electrically connected in parallel, which permits the two coil sections to be wound at the same time as each other, for example.

In the parallel-connected coil sections, the respective ends of the first coil section and the two ends of the second coil section are electrically connected to the same two laminations so that the two coil sections can be commutated simultaneously.

The arrangement of the two coil sections symmetrically to each other on the armature core is optimized in such a way that with the simultaneous flow of current through the two coil sections, the radially acting forces are compensated for to the greatest extent possible.

According to the invention, the commutator has an even number of laminations, for example eight or ten laminations; the two brushes, preferably contact the laminations offset from each other by approximately 180°. Each pair of coil sections is connected to a pair of laminations.

In order to assure the most uniform possible flow of current during commutation, the brushes are embodied so that as the commutator rotates, they each overlap two adjacent laminations so as to short circuit them. This makes it possible to significantly reduce brush sparking.

It is advantageous to embody the coil sections in the form of a double winding equipped with two approximately parallel coil wires with a reduced cross section. This makes it possible to achieve a higher space factor of the grooves and therefore to increase the output of the electric motor without increasing production time.

The manufacturing method according to the invention for a two-poled electric machine with two coil sections situated symmetrically to each other can be used to easily manufacture a reduced-noise electric drive motor of the kind used, for example, in adjusting applications in motor vehicles. This does not require any appreciable increase in complexity compared to conventional winding methods, thus making it possible, in a cost-neutral fashion, to achieve a significant increase in the quality of the electric machine by reducing the amount of noise it generates.

Various exemplary embodiments of an electric machine according to the invention are shown in the drawings and will be explained in detail in the description that follows.

DESCRIPTION OF THE PREFERRED EMBODIMENTS

Figure 1:
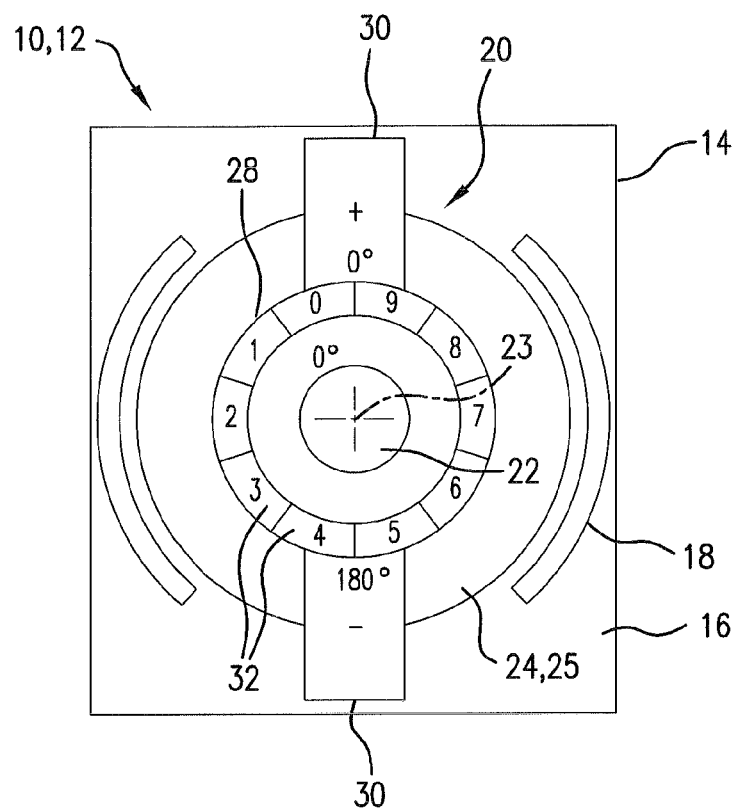
FIG. 1 shows a schematic cross section through an electric machine.

FIG. 1 schematically depicts a cross section through an electric machine 10 that is embodied in the form of a two-poled dc motor 12 in the exemplary embodiment. A housing 14 contains a stator 16, which is equipped with two permanent magnets 18 and cooperates with a rotor 20 that is supported so that it can rotate in the housing 14. The rotor 20 has a rotor shaft 22 and a laminated armature core 24 on which coils 26 are wound in the form of chords. The armature shaft 22 also supports a commutator 28 that can be electrically commutated via brushes 30. In the exemplary embodiment, the two brushes 30 are situated offset from each other by approximately 180° and are embodied in such a way that as the commutator 28 rotates in relation to the brushes 30, at the transition from one commutator lamination 32 to an adjacent commutator lamination 32, the brushes 30 short circuit the two laminations. The two brushes 30 are labeled with a plus and a minus that symbolize the flow of current and represent the electrical connections of the coils 26 shown in FIGS. 3 and 6. The commutator 28 has an even number of laminations 32 that are labeled with the reference numerals 0 through 9 (i.e. there are ten of them). The laminations 32 are electrically insulated from one another.

Figure 2:
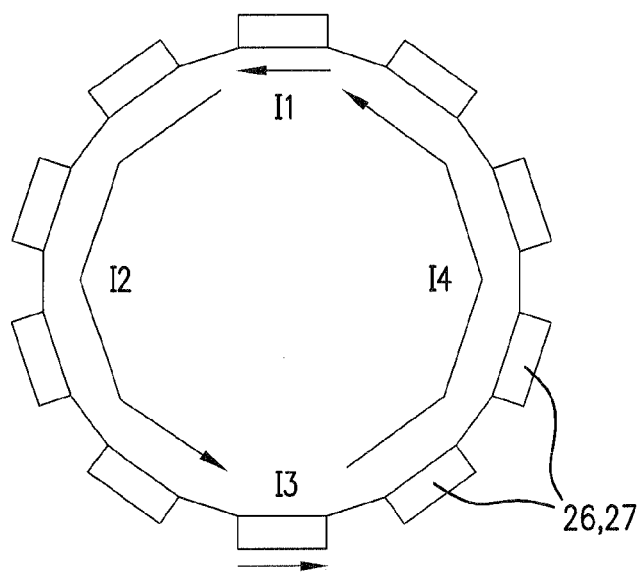
FIG. 2 is a schematic representation of the current branches in the coils.

FIG. 2 schematically depicts the flow of current when the brushes 30 overlap the laminations 32 as shown in FIG. 1. The short circuiting of two commutator laminations 32 generates a current I1 through a coil 26, for example under the plus brush 30, between the two adjacent laminations 32 (9 and 0). Between the plus brush 30 and the minus brush 30, there is a current branch I2, which in another coil 26 between the laminations 32 (0 and 4), a current I3 between two adjacent laminations 32 (4 and 5) and in turn a current branch I4 between the minus brush 30 and the plus brush 30 (laminations 5 and 9).

Figure 3:
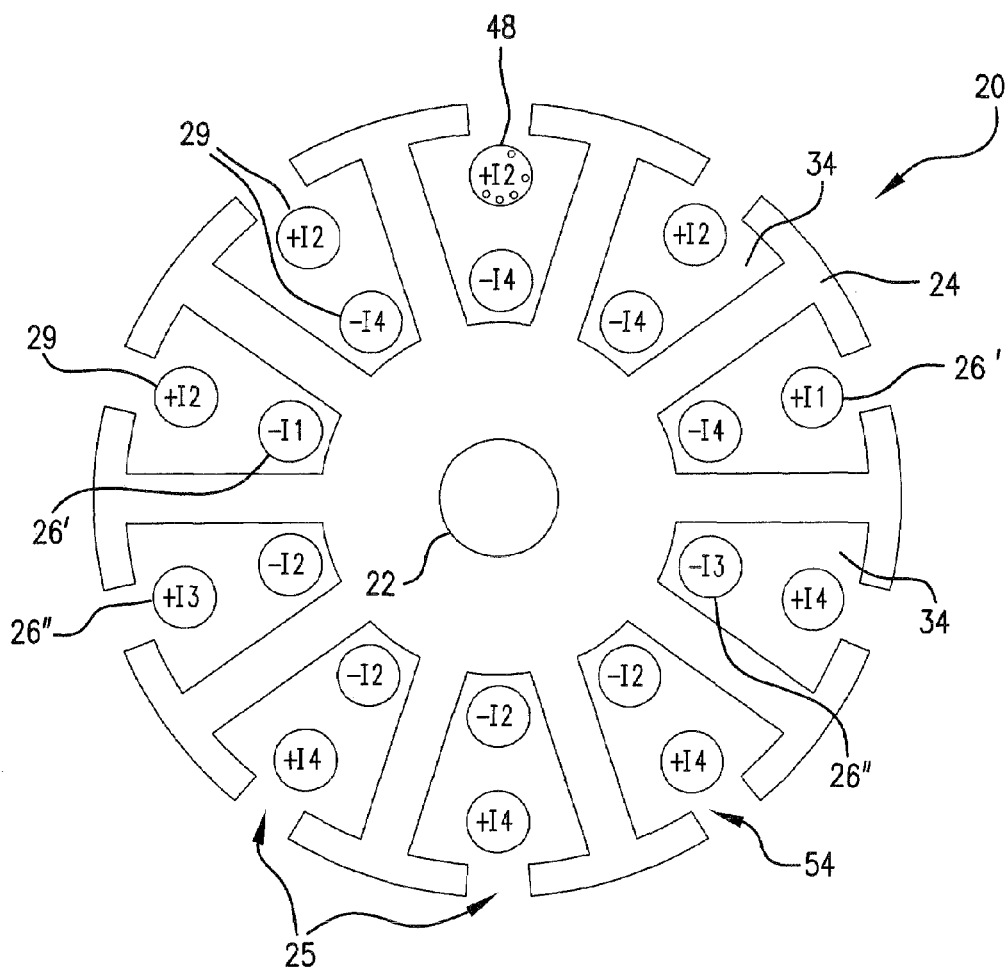
FIG. 3 is a cross section through the armature winding according to the prior part.

FIG. 3 shows the current flow according to FIG. 2 in a schematic cross section through the armature core 24, with a chorded loop winding according to the prior part. In accordance with the ten laminations 32 of the commutator 28, the armature core 24 has ten grooves 34 into which a total of ten coils are wound. Each groove 34 is thus provided with two phase windings 29 of different coils 26. The differences in the brush voltage drop between the plus brush 30 and the minus brush 30 and the asymmetry in the positioning of the brushes 30 due to production tolerances result in unequal current levels in the opposing grooves 34, not only in I1 and I3, but also in I2 and I4. For example, the current I1 travels in one chord-like coil 26', whose windings are depicted with the two circuits +I1 and −I1. At the same time, in the short circuit situation depicted in FIG. 2, the current I3 flows in the coil 26", depicted with the circuits +I3 and −I3. It is clear in FIG. 3 that in the prior art, the current level is unequal in the respectively opposing grooves 34 in which the currents I1 and I3 flow, which inequality exerts radial forces 36 on the rotor 20.

Figure 4:
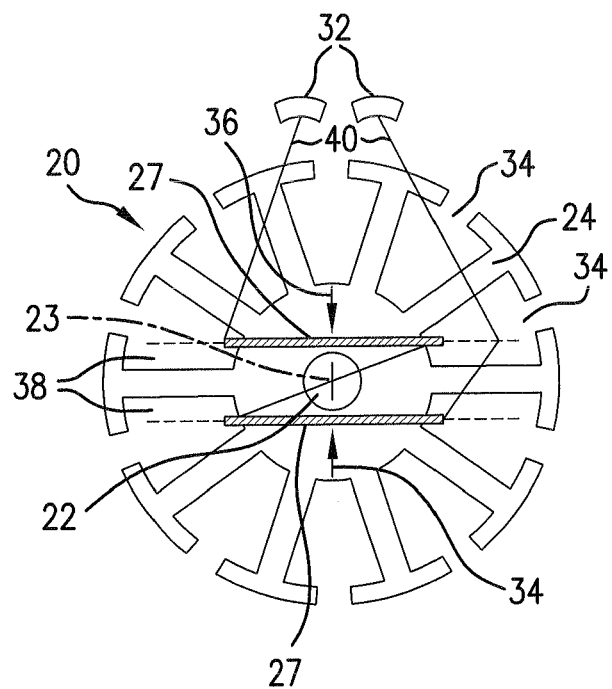
FIG. 4 is a schematic armature cross section, with the coil sections connected in series.

FIG. 4 is a schematic cross section through an armature core 24 in which a coil 26 is wound according to the invention in the form of two coil sections 27 in different grooves 34. The two coil sections 27 are situated in virtually parallel planes 38 that are spaced the same distance apart from the armature shaft 22, i.e. from the rotation axis 23, and are symmetrical to it (chorded winding). The two coil sections 27 are electrically connected in series with each other so that starting from the first lamination 32, the current first flows through the first coil section 27, then through the second coil section 27, and then to a second lamination 32. If the brushes 30 supply these two laminations 32 with current, then the respective radial forces 36 of the two symmetrical coil sections 27 compensate for each other. For the sake of clarity, FIG. 4 schematically depicts only two laminations and one pair of coil sections 27. In the actual layout, several pairs of coil sections 27 are each connected to a respective pair of laminations 32. The coil 26 shown in FIG. 4, which is comprised of two coil sections 27, could, for example, be associated with the current flow I1 between the laminations 32 (9 and 0) from FIG. 2 and FIG. 1.

Figure 5:
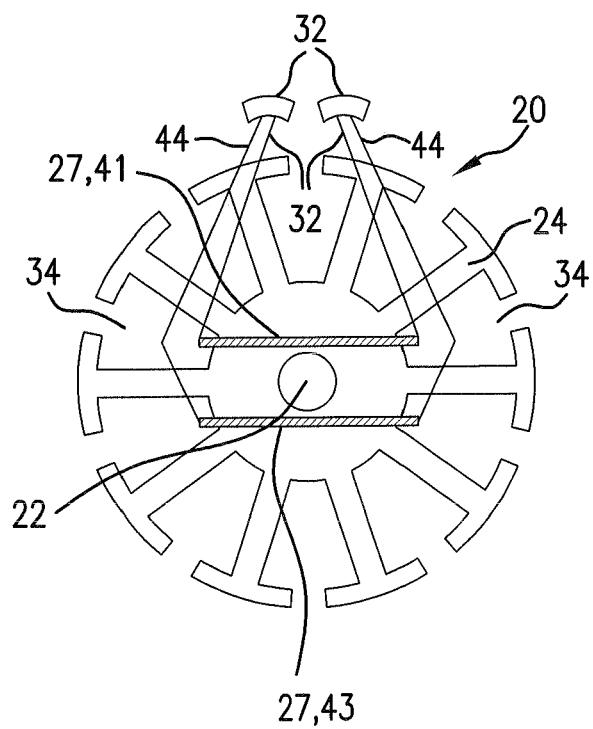
FIG. 5 is a schematic armature cross section, with the coil sections connected in parallel.

In the embodiment according to FIG. 5, the two coil sections 27 are once again situated symmetrically in relation to the rotation axis 23. The two coil sections 27 are each wound in respective groove pairs 34, producing a geometrically parallel arrangement of coil sections 27 spaced approximately the same distance apart from the rotation axis 23. In such chorded windings, the windings 54 do not pass through the rotation axis 23. But in this embodiment, the two coil sections 27 are electrically connected in parallel so that the respective ends 42 of the first coil section 41 and the two ends 44 of the second coil section 43 are respectively connected to the two laminations 32 (9 and 0) in the same fashion. With these parallel-connected coil sections 27, too, a pair of coil sections 27 is commutated simultaneously by the two laminations 32. According to a preferred embodiment of the invention, the two coil sections 27 in both the series circuit and the parallel circuit are wound in opposite winding directions from each other, i.e. when the armature winding 25 is being wound, after the rotation of the rotor 20 by approx. 180°, the second coil section 27 is wound in the opposite direction in relation to the winding machine.

Figure 6:
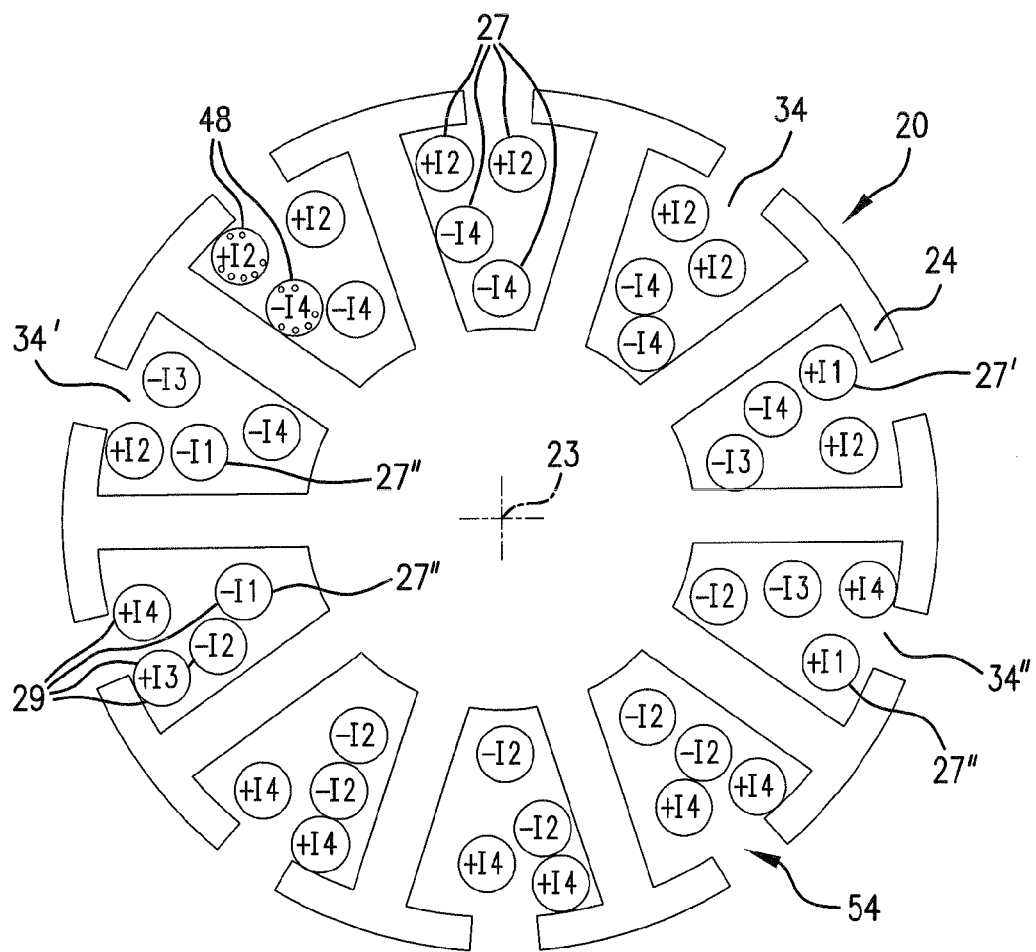
FIG. 6 is a cross section through an armature winding according to the invention.

FIG. 6 is a schematic cross section through the armature core 24, in which the respective coils 26 are embodied as two coil sections 27 arranged symmetrically to each other, but this time with four phase windings 29 situated in each groove 34. This becomes particularly clear when one compares the coil arrangement according to the invention in FIG. 6 to the coil arrangement according to the prior art in FIG. 3. Each coil from FIG. 3 is placed in two symmetrically situated coil sections 27', 27", where with a series connection of the coil sections 27' and 27", the total number of windings 54 of the two coil sections 27', 27" is identical to the number of windings 54 of the coil 26 according to FIG. 3. But in the present instance, the current load is identical in the opposing grooves 34 in which the currents I1 and I3 flow. As a result, the currents +I3, −I1, +I2, −I4, of the groove 34' compensate for the currents −I3, +I1, −I2, +I4 of the opposing groove 34". This largely eliminates interfering radial forces 36.

Figure 11:
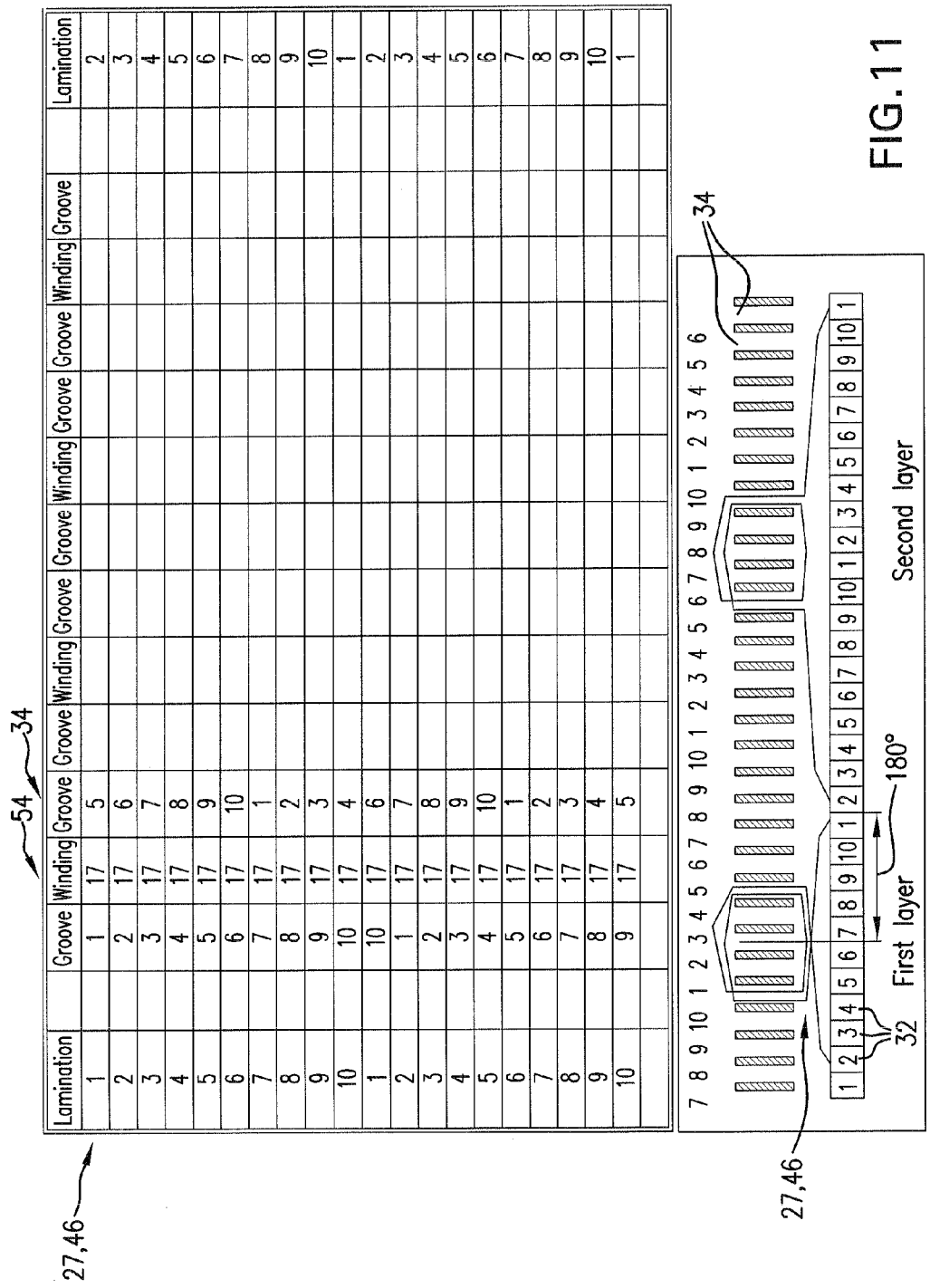
Figure 14:
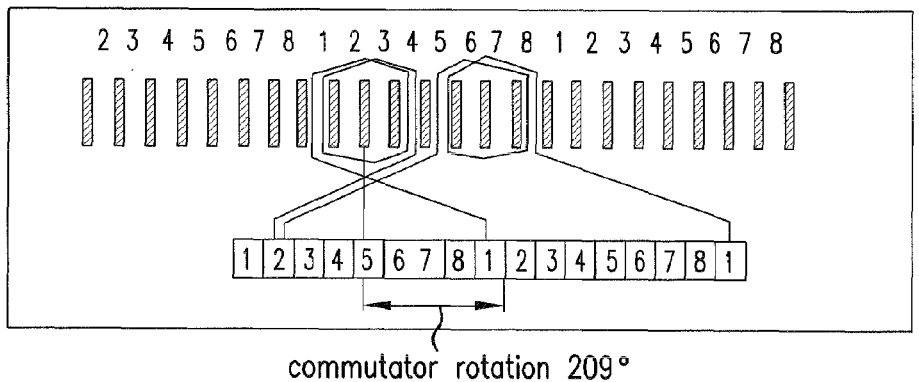
FIGS. 13 and 14 show winding schemes for a commutator with eight laminations.

With a parallel connection of the coil sections 27' and 27", the total number of windings 54 doubles in relation to that in the series-connected coil sections 27; the wire cross sections of the coil wires 48 are correspondingly halved, thus yielding the same current load. This corresponds to a double winding in which the two coil sections 27 are not, however, wound into the same grooves 34, but are instead wound in the form of two symmetrically situated coil sections 27 spaced the same distance apart from the rotation axis 23. The winding scheme for this double winding is shown in FIGS. 11 and 14.

Figure 7:
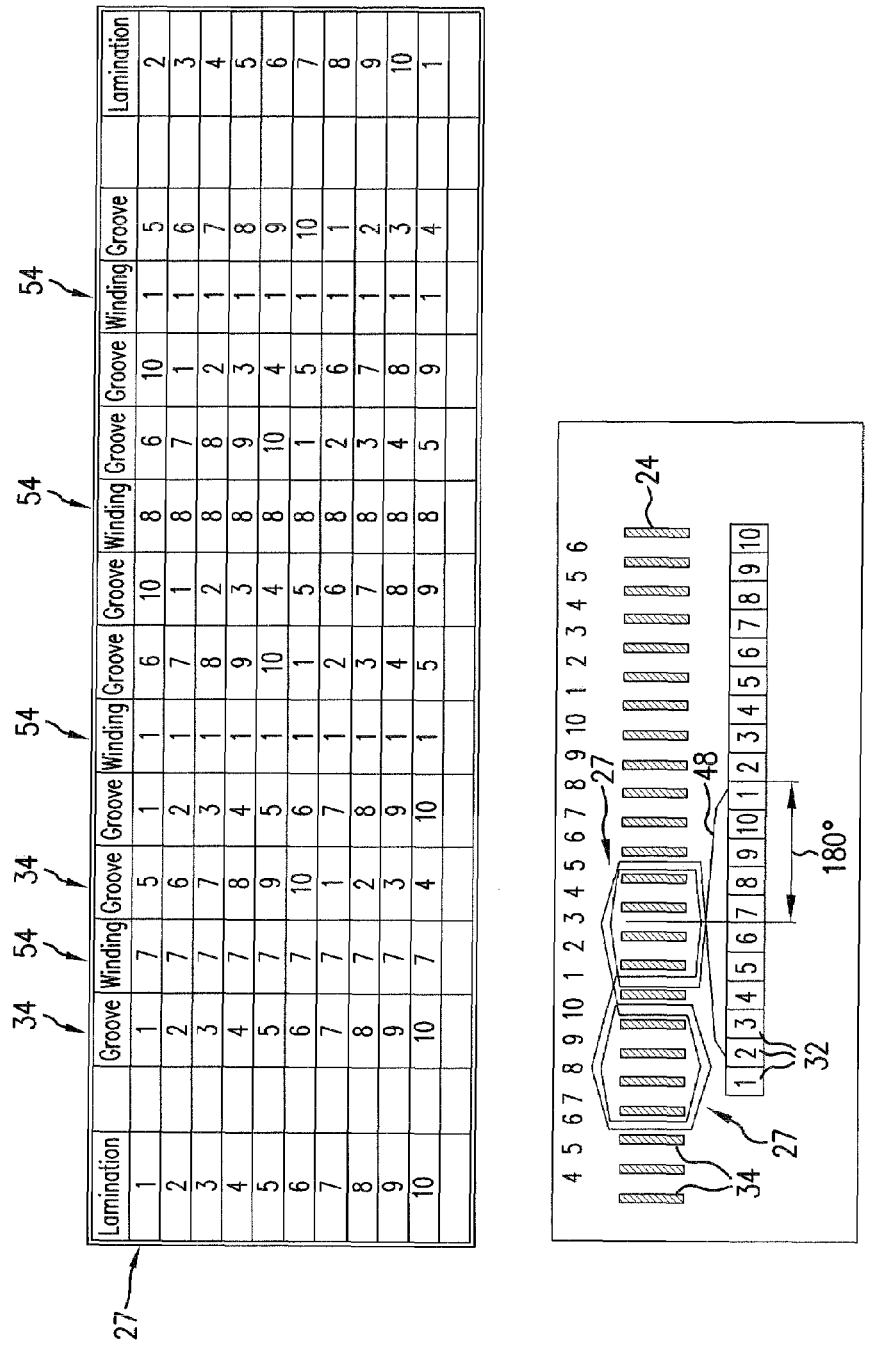
FIGS. 7 through 11 show various winding schemes for a commutator with ten laminations.
Figure 8:
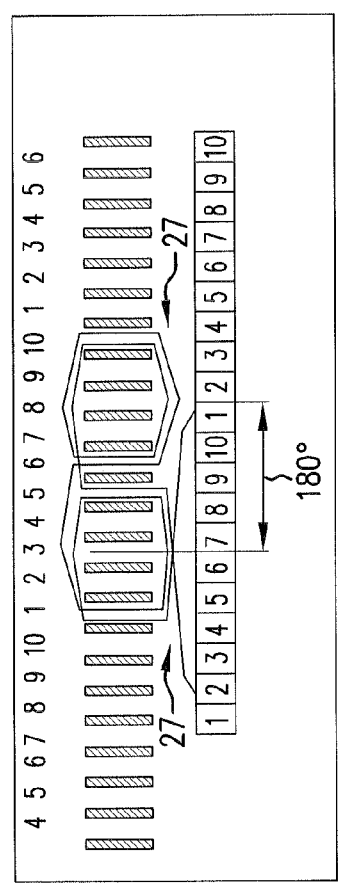
Figure 9:
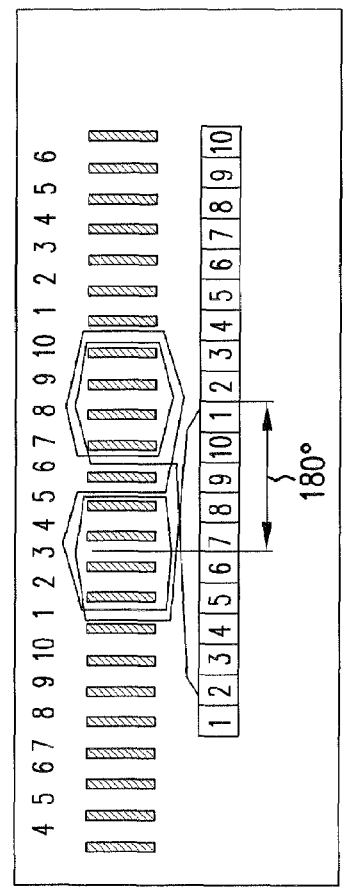
Figure 10:
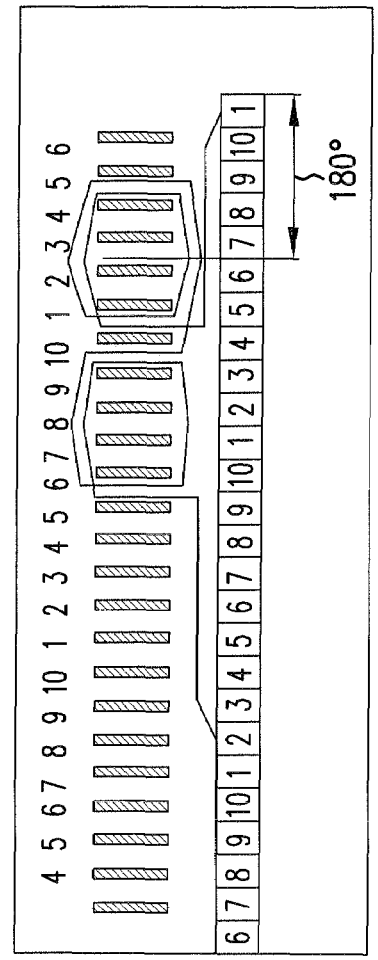

FIGS. 7 through 11 show different variants for a winding with symmetrical coil sections 27; the winding scheme in FIG. 7 will be explained by way of example below. At the bottom edge of the drawing, the ten laminations 32 of the commutator are depicted in the form of small boxes; the drawing shows two developed rotations of the commutator 28. Situated above them, the grooves 34 of the armature core 24 are schematically depicted, likewise in the form of two developed rotations. In the lower half of the drawing, a pair of coil sections 27 is schematically depicted, which corresponds to the second row of the table above. Starting from the lamination 1 (right), the coil wire 48 is first placed in the groove 1 and then in the groove 5, thus forming a coil section 27 with seven windings 54 (wdg). After the seventh complete winding 54, the coil wire 48 once again lies in the groove 1 in order to then travel leftward to the groove 6 in order to form the second coil section 27. Between groove 6 and groove 10, the second coil section 27 is wound with eight windings; then one more winding is wound onto the first coil section 27 between groove 10 and groove 5 in order for the coil wire 48 to then contact the lamination 2 (left). This results in a symmetrical arrangement of two coil sections 27, each with the same number of windings 54. The respective coil sections 27 are wound according to this scheme, row by row according to the table above so that a total of ten pairs of coil sections 27 are situated between two adjacent laminations.

Thus FIGS. 7 through 10 show different variations, each with ten coil section pairs 27 between two respective laminations 32. The coil wire 48 in these instances has, for example, a wire diameter of 0.5 mm. In FIG. 11, the coil sections 27 are situated as a double winding in a first and second layer; in this case the wire diameter is 2×0.355 mm, for example.

Figure 12:
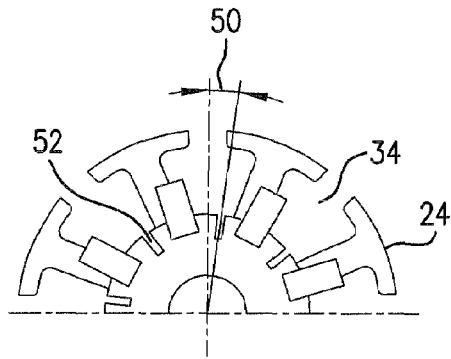
FIG. 12 is a schematic cross section to illustrate the commutator rotation.

FIG. 12 schematically depicts the rotation of the commutator 28 in relation to the armature core 24. In it, a rotation angle 50 is defined that extends from the center of the groove 34 to the center of a slot 52 between two laminations 32. In the exemplary embodiments according to FIGS. 7 through 11, this angle 50 of the commutator rotation is approximately 0°. In the exemplary embodiments according to FIGS. 13 and 14, this angle 50 is 209°, for example.

Figure 13:
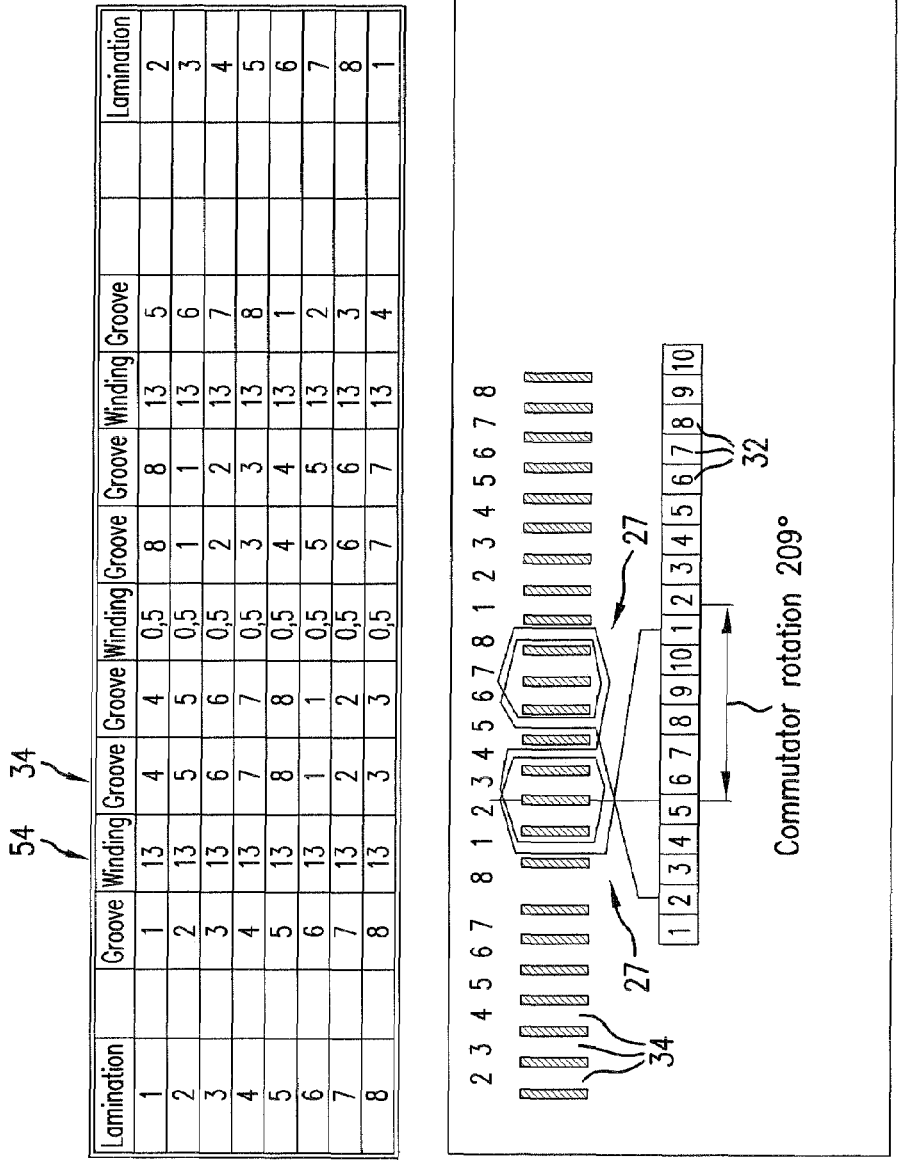

According to FIGS. 13 and 14, the commutator 28 has, for example, eight laminations 32 and correspondingly has eight grooves 34 in the armature core 24.

In FIG. 13, according to the eight lines of the table at the top, two symmetrical coil sections 27 are each placed eight times between two laminations 32. The number of the individual windings 54 (wdg) and the coil wire diameter can be adapted to the respective application. In a fashion analogous to FIG. 11, FIG. 14 once again shows a double winding in which the total number of windings (wdg) of the two coil sections is increased in comparison to FIG. 13, for which purpose the wire diameter is reduced (for example from 0.425 to 2×0.3 mm).

It should be noted with regard to the exemplary embodiments of the specification shown in all of the figures that there are a multitude of possibilities for combining the individual defining characteristics with one another. It is thus possible, for example, to vary the number of laminations 32 and grooves 34 as well as their concrete layout. Furthermore, the large number of winding schemes demonstrated should not in any way be taken to represent a limitation with regard to the winding of symmetrical coil sections 27; there are, instead, various possible transitions from one coil section 27 to the other. The exemplary embodiments according to FIGS. 7 through 14 describe both the concrete layout of the various electrical machines 10 and also their manufacturing method. In particular, the figures demonstrate the method for winding symmetrical coil sections 27 according to the present invention.

What is claimed is:

1. An electric machine (10), in particular for moving mobile parts in a motor vehicle, having a rotor (20) on which is situated a two-poled electric winding (25) with multiple coils (26), wherein the coils (26) are each embodied in the form of two symmetrical coil sections (27) that are situated symmetrically to each other in relation to the rotation axis (23) of the rotor (20), in which it is possible to commutate the two coil sections (27) simultaneously wherein the two parallel-connected coil sections (27, 41, 43) each have two respective ends (42, 44) and each pair of ends (42, 44) is connected to a respective lamination (32), so that the both coil sections (27) are simultaneously commutated by the both laminations (32).

2. The electric machine (10) as recited in claim 1, wherein the two coil sections (27) have the same number of windings (54) and are situated approximately parallel to each other, geometrically.

3. The electric machine (10) as recited in claim 1,
wherein the two coil sections (27) are wound in opposite winding directions from each other on an armature core (24).

4. The electric machine (10) as recited in claim 1,
wherein the two coil sections (27) are electrically connected to each other in series.

5. The electric machine (10) as recited in claim 1, wherein the two series-connected coil sections (27) together have two ends (40), which are each connected to a respective lamination (32) of a commutator (28).

6. The electric machine (10) as recited in claim 1, wherein the two coil sections (27) are electrically connected to each other in parallel.

7. The electric machine (10) as recited in claim 1, wherein the coil sections (27) are situated symmetrically to each other in such a way that when they are supplied with current, virtually no radial forces (36) on the rotor (20) are generated in a magnetic field.

8. The electric machine (10) as recited in claim 1,
wherein the commutator (28) has an even number of laminations (32) and the commutator (28) is contacted by two opposing brushes (30).

9. The electric machine (10) as recited in claim 1,
wherein the brushes (30) each overlap two respective adjacent laminations (32) and thus electrically short circuit them.

10. The electric machine (10) as recited in claim 1,
wherein the symmetrical coil sections (27) are embodied in the form of a double winding (46) in two layers, with a reduced coil wire diameter.

11. A method for winding an electric machine (1) with coil sections (27) situated symmetrically on a rotor (20) as recited in claim 1.

12. The electrical machine (10) as recited in claim 1, wherein the coiled sections (27) are situated symmetrically on the rotator (20).

13. The electrical machine (10) as recited in claim 1, wherein the two parallel-connected coil sections (27', 27") have wire cross sections of coil wires that are correspondingly halved and wound not in same grooves (34) but instead are wound in a form of two symmetrically situated coil sections (27) spaced a same distance apart from a rotation axis (23).

* * * * *